(12) United States Patent
Doyle (10) Patent No.: US 7,747,442 B2
(45) Date of Patent: Jun. 29, 2010

(54) SPEECH RECOGNITION APPLICATION GRAMMAR MODELING

(75) Inventor: Sean Doyle, Mountain View, CA (US)

(73) Assignee: SAP AG, Walldorf (DE)

( * ) Notice: Subject to any disclaimer, the term of this patent is extended or adjusted under 35 U.S.C. 154(b) by 838 days.

(21) Appl. No.: 11/603,673

(22) Filed: Nov. 21, 2006

(65) Prior Publication Data

US 2008/0120111 A1 May 22, 2008

(51) Int. Cl.
G10L 15/00 (2006.01)
G10L 15/18 (2006.01)
G10L 21/00 (2006.01)

(52) U.S. Cl. .................. 704/270; 704/257; 704/275

(58) Field of Classification Search ......... 704/243–244, 704/251, 270, 270.1, 275, 257; 379/88.01
See application file for complete search history.

(56) References Cited

U.S. PATENT DOCUMENTS

| | | | |
|---|---|---|---|
| 5,546,525 A | 8/1996 | Wolf et al. | |
| 5,572,570 A | 11/1996 | Kuenzig | |
| 6,091,802 A | 7/2000 | Smith et al. | |
| 6,173,266 B1* | 1/2001 | Marx et al. | 704/270 |
| 6,434,523 B1 | 8/2002 | Monaco | |
| 7,031,907 B1 | 4/2006 | Passaretti et al. | |
| 7,082,391 B1* | 7/2006 | Merrill | 704/231 |
| 7,143,042 B1* | 11/2006 | Sinai et al. | 704/270.1 |
| 7,149,694 B1* | 12/2006 | Harb et al. | 704/270.1 |
| 7,177,814 B2* | 2/2007 | Gong et al. | 704/270.1 |
| 7,206,391 B2* | 4/2007 | Chiu et al. | 379/88.25 |
| 7,305,342 B2* | 12/2007 | Shizuka et al. | 704/260 |
| 7,395,505 B1* | 7/2008 | Khosla et al. | 704/E15.045 |
| 7,426,468 B2* | 9/2008 | Coifman et al. | 704/275 |
| 7,487,084 B2 | 2/2009 | Aaron et al. | |
| 7,552,055 B2* | 6/2009 | Lecoeuche | 704/270.1 |
| 2002/0069064 A1 | 6/2002 | Dejaco et al. | |
| 2003/0115066 A1 | 6/2003 | Seeley et al. | |
| 2004/0086095 A1 | 5/2004 | Dixit et al. | |
| 2004/0093216 A1* | 5/2004 | Ashish et al. | 704/270.1 |

(Continued)

FOREIGN PATENT DOCUMENTS

EP 1116221 7/2003

OTHER PUBLICATIONS

"Nuance Speech Recognition version 8—Grammar Developers Guide", *Nuance Communications, Inc.* http://community.voxeo.com/vxml/docs/nuance20/grammar.pdf, (2001),196 pgs.

(Continued)

*Primary Examiner*—James S Wozniak
(74) *Attorney, Agent, or Firm*—Schwegman, Lundberg & Woessner, P.A.

(57) ABSTRACT

The subject mater herein relates to voice applications and, more particularly, speech recognition application grammar modeling. Various embodiments provide systems, methods, and software to present one or more user interfaces through which to receive input to define and manipulate properties of a graphical listen element, wherein the properties identify one or more data sources. Some such embodiments further include building a speech recognition program grammar as a function of one or more graphical listen elements, wherein the grammar includes a representation of data retrieved from the one or more data sources.

20 Claims, 12 Drawing Sheets

U.S. PATENT DOCUMENTS

| | | | |
|---|---|---|---|
| 2004/0111259 A1* | 6/2004 | Miller et al. | 704/231 |
| 2004/0122831 A1 | 6/2004 | Ha et al. | |
| 2004/0148586 A1 | 7/2004 | Gilboa | |
| 2005/0071171 A1 | 3/2005 | Dvorak | |
| 2005/0197836 A1 | 9/2005 | Cohen et al. | |
| 2006/0074652 A1 | 4/2006 | Ativanichayaphong et al. | |
| 2007/0100872 A1* | 5/2007 | Bodin et al. | 707/102 |
| 2008/0112542 A1 | 5/2008 | Sharma | |
| 2008/0154590 A1 | 6/2008 | Doyle | |

OTHER PUBLICATIONS

June Esprit Long-Term, "State-of-the-Art Survey of Existing Dialogue Management Tools", *Disc Deliverable D2.7 Jun. 2000 Esprit Long-Term Research Concerted Action No. 24823 Spoken Language Dialogue Systems and Components: Best practice in development and evaluation*, (Jun. 2000).

Power, Kevin, et al., "The grapHvite Book", (1997), 83 pgs.

SAP, "VC 60 Users Guide", 208 pgs.

"U.S. Appl. No. 11/645,305, Response filed Nov. 10, 2009 to Non Final Office Action mailed Aug. 10, 2009", 11 pgs.

"U.S. Appl. No. 11/645,305, Non-Final Office Action mailed Aug. 10, 2009", 11 Pgs.

* cited by examiner

SPEECH RECOGNITION APPLICATION GRAMMAR MODELING

TECHNICAL FIELD

The subject matter herein relates to voice applications and, more particularly, speech recognition application grammar modeling.

BACKGROUND INFORMATION

Speech recognition applications, such as telephone interactive voice response systems, can be created using graphical programs. Such graphical programs provide tools for use in creating speech recognition grammars. A speech recognition grammar includes words or phrases that a speech recognizer within a speech recognition system will recognize as valid input into the system.

The graphical programs that provide tools for use in creating speech recognition grammars are useful when creating finite grammars, such as when acceptable inputs include, for example, numbers or yes/no answers to questions. However, when the number of acceptable inputs includes larger volumes of possibilities, such as when the acceptable inputs include large amounts of data from databases, these graphical tools are lacking and require error-prone, manual coding. Further, if the data of these grammars is dynamic, modifying the grammar as dictated by changes in the underlying data also requires manual coding.

DETAILED DESCRIPTION

Voice applications generally require grammars which specify what a user can say and will be recognized at various points throughout the application. Building a grammar which incorporates various fields stored in data sources, such as databases, or generated by application or object services previously required writing code such as Java or eXtensible Markup Language (XML) documents. The various embodiments described herein provide voice application graphical design tools for generating voice applications. In some embodiments, the graphical design tools include a tool to graphically model and generate voice application grammars as a function of data stored in one or more data sources. Some such embodiments also include automatic updates of voice application grammars that are generated as a function of the data stored in the one or more data sources. In other embodiments, the grammars may be generated dynamically upon request of a voice application user.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein may be implemented in hardware, firmware, software, or a combination of software, firmware, and hardware in various embodiments. The software comprises computer executable instructions stored on computer readable medium such as memory or other type of storage devices. Further, such functions correspond to modules, which are software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
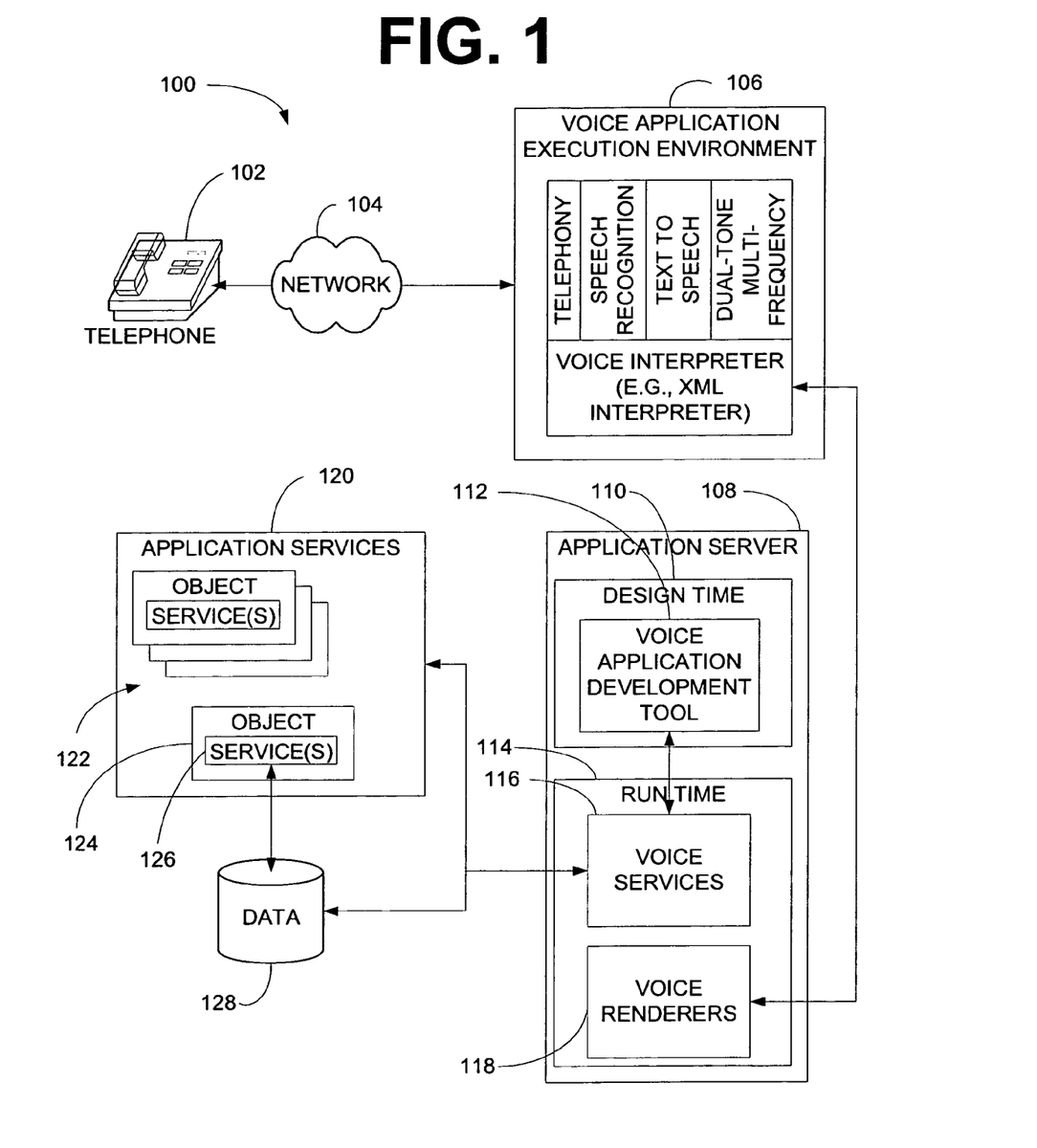
FIG. 1 is a block diagram of an example system embodiment.

FIG. 1 is a block diagram of an example system 100 embodiment. In this embodiment, the system 100 includes a telephone 102 connected to a network 104. Also connected to a network is a voice application execution environment 106. The voice application execution environment 106 is operatively coupled to a computing environment that includes an application server 108, application services 120, and data sources 128.

The telephone 102, in some embodiments, includes virtually any telephone such as a wired or wireless telephone. There may be one or more telephones 102. The network 104 includes one or more networks capable of carrying telephone signals between a telephone 102 and the voice application execution environment 106. Such networks may include one or more of a public switched telephone network (PSTN), a voice over Internet Protocol (VOIP) network, a local phone network, and other network types.

The voice application execution environment 106 includes an application execution environment within which a voice application providing interactive voice dialogues may execute to receive input and provide output over the network 104 while connected to a telephone 102. An example application execution environment 106 is available from VoiceObjects of San Mateo, Calif.

In some embodiments, the voice application execution environment 106 includes various components. Some such components include a telephone component to allow an application executing within the environment to connect to a telephone call over the network 104, and a speech recognition component to recognize voice input, a text to speech engine to generate spoken output as a function of text. The components may further include a dual-tone multi-frequency (DTMF) engine to receive touch-tone input and a voice interpreter to interpret programmatic data and provide data to the text to speech engine to generate spoken output and to provide grammars to the speech recognition component to recognize voice input.

The voice interpreter, in some embodiments, is an eXtensible Markup Language (XML) interpreter. In such embodiments, the voice interpreter includes, or has access to, one or more XML files that define voice prompts and acceptable grammars and DTMF inputs that may be received at various points in an interactive dialogue.

The application server 108 is an environment within which applications and application component can execute. The application server 108, in some embodiments, is a J2EE compliant application server 108 includes a design time environment 110 and a runtime environment 114.

The design time environment includes a voice application development tool 112 that can be used to develop voice applications, such as an Interactive Voice Response (IVR) application that executes at least in part within the voice application execution environment 106. The voice application development tool 112 allows for graphical modeling of various portions of voice applications including grammars derived from data stored in one or more data sources 128. In some embodiments, the one or more data sources 128 include databases, objects 122 and 124, object 124 services 126, files, and other data stores. The voice application development tool 112 is described further with regard to FIG. 2 below.

The run time environment 114 includes voice services 116 and voice renderers 118. The voice services and voice renderers, in some embodiments, are configurable to work in conjunction with the voice interpreter of the voice application execution environment 106 to provide XML documents to service interactive voice response executing programs. In some embodiments, the voice services access data from the application services 120 and from the data sources 128 to generate the XML documents.

Figure 2:
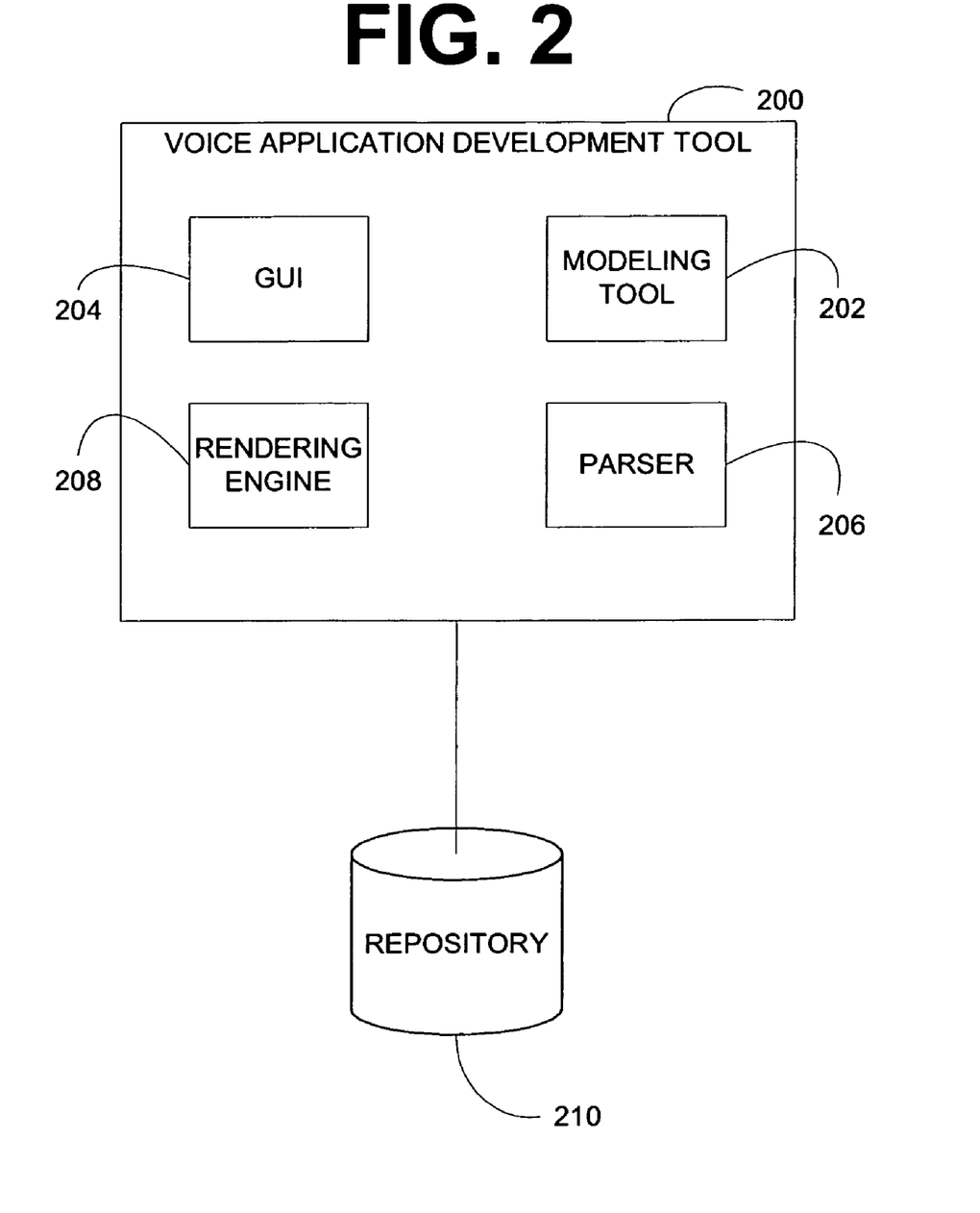
FIG. 2 is a block diagram of an example system embodiment.

FIG. 2 is a block diagram of an example system embodiment. The system includes a voice application development tool 200. The voice application development tool 200 of FIG. 2 is an example embodiment of the voice application development tool 112.

The voice application development tool 200 includes a modeling tool 202, a graphical user interface (GUI) 204, a parser 206, and a rendering engine 208. Some embodiments of the system of FIG. 2 also include a repository 210 within which models generated using the modeling tool 202 via the GUI 204 are stored.

The voice application development tool 200 enables voice applications to be modeled graphically and operated within various voice application execution environments by translating modeled voice applications into different target metadata representations compatible with the corresponding target execution environments. The GUI 204 provides an interface that allows a user to add and configure various graphical representations of functions within a voice application. The modeling tool 202 allows a user to design a graphical model of a voice application by dragging and dropping icons into a graphical model of a voice application. The icons may then be connected to model flows between the graphical representations of the voice functions. In some embodiments, when a graphical model of a voice application is saved, the graphical model is processed by the parser 206 to generate a metadata representation that describes the voice application. In some embodiments the voice application metadata representation is stored in the repository 120. The metadata representation may later be opened and modified using the modeling tool 202 and displayed in the GUI 204.

In some embodiments, the metadata representation of a voice application generated using the GUI 204 and the modeling tool 202 is stored as text formatted in XML. In some such embodiments, the metadata representation is stored in a format that can be processed by the rendering engine 208 to generate the metadata representation in a form required or otherwise acceptable to an application execution environment, such as VoiceXML or Visual Composer Language (VCL) which is an SAP proprietary format. In other embodiments, the metadata representation of a voice application may be formatted in an open standard markup language, such as VoiceXML or VCL.

As discussed above, the modeling tool 202 and the GUI 204 include various graphical representations of functions within a voice application that may be added and configured within a graphical model. The various graphical representations of functions within a voice application may include a graphical listen element. A graphical listen element is an element which allows modeling of a portion of a voice application that receives input from a voice application user, such as a caller. A graphical listen element includes a grammar that specifies what the user can say and will be recognized by the voice application.

The grammar of a graphical listen element may include one or more grammar types. Example grammar types include phrase, list, and field. A phrase is a word or phrase and is generally typed into a property listing of the graphical listen element. An example phrase is "yes" where the acceptable input is "yes." A list type includes a list of acceptable, or alternative, phrase types. For example, "yes," "yeah", "correct," and "that's right," may be acceptable alternative phrases in a particular graphical listen element. A field type refers to one or more fields of a data source, such as a database that provides acceptable inputs from a user.

A field type may include several properties, depending on the needs of the application. Some such properties identify the data source and data fields, any table or other data source joins, any required retrieval arguments to retrieve data, any filters necessary to remove unwanted data, and transformations to transform data into another form. For example, transformations are useful when the data includes an abbreviation such as "corp." or "Jr." Transformations can be defined in the graphical listen element properties to transform the data into "corporation" and "junior," respectively.

Thus, through use of the modeling tool 202 and the GUI 204, a voice application can be modeled and an encoded representation that can be utilized in a voice application execution environment can be created without manually coding the voice application. This reduces complexity and errors in coding voice applications and can reduce the time necessary to create, modify, and update voice applications.

Figure 3:
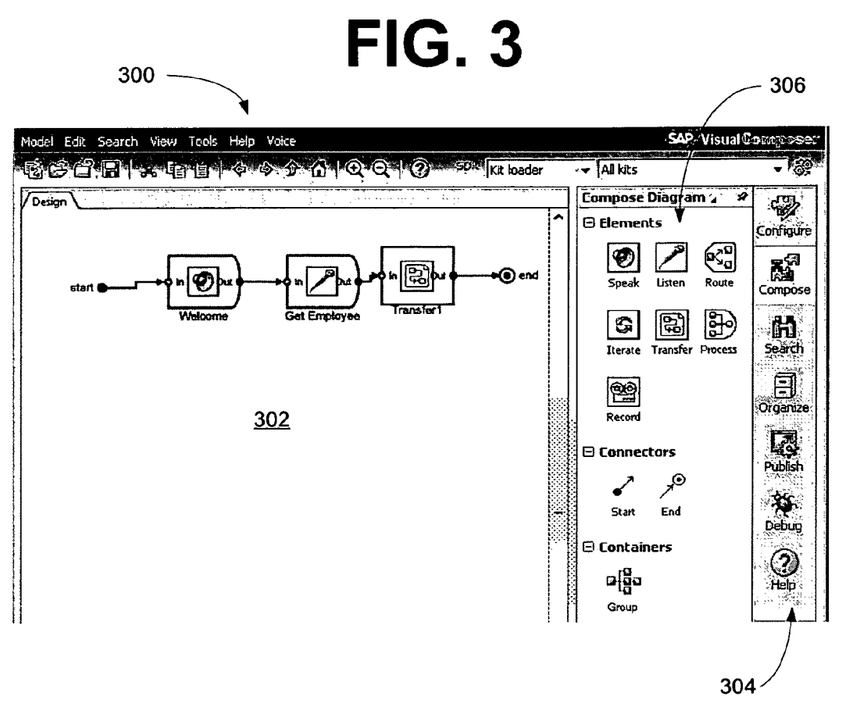
FIG. 3 is a diagram of an example user interface embodiment.

FIG. 3 is a diagram of an example user interface 300 embodiment. The user interface 300 includes a design portion 302, a menu portion 304, and an element portion 306. The design portion 302 is a workspace within which a user may drag elements from the element portion 306 and drop to create voice application flows. The menu portion 304 allows a user to select various user interfaces to create, test, organize, configure and perform other development tasks related to voice application development.

The flow illustrated within the design portion 302 workspace is an example voice application flow. The example flow is in the context of a voice application that operates to serve as a telephone auto-attendant that answers phone calls and allows a call to choose where to route the call. The flow includes a start point, a "Welcome" speak element that greets the caller and provides instructions, a "Get Employee" listen element to listen for caller input, and a transfer element to transfer the caller to the requested person or extension or to a default extension. The flow terminates with an end element.

When a user wishes to configure an element to modify element properties, the user selects the element to configure in the design portion 302 and selects the configure item of the menu portion 304. In this instance, the user selects the "Get Employee" listen element and selects the configure element. As a result, the user interface 400 of FIG. 4 is displayed.

Figure 4:
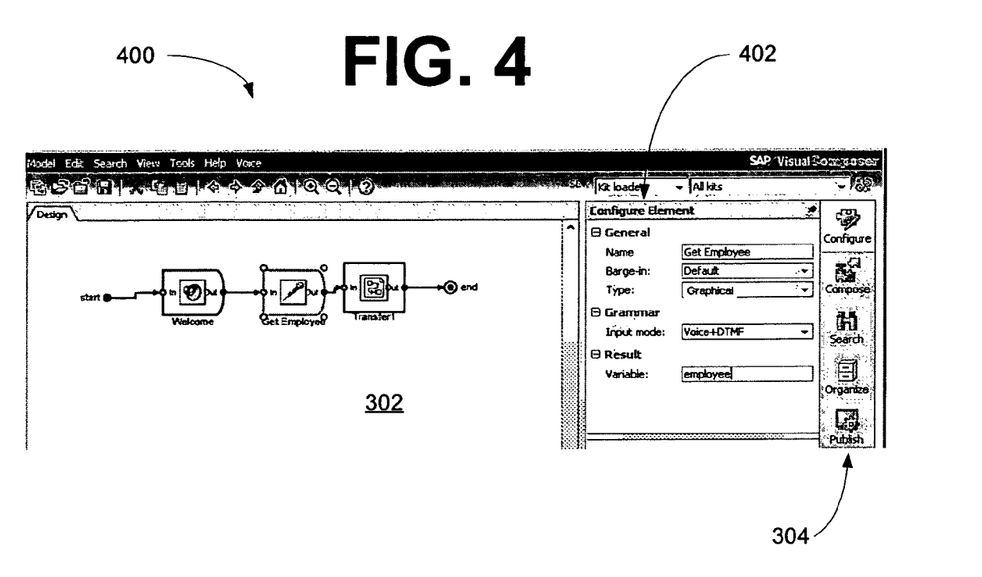
FIG. 4 is a diagram of an example user interface embodiment.

FIG. 4 is a diagram of an example user interface 400 embodiment. The user interface 400 includes the design portion 302 and the menu portion 304. However, the element portion 306 is replaced with the configure element portion 402. The configure element portion 306 includes input fields to configure the element selected in the design portion 302. In this instance, the "Get Employee" listen element is selected and the configure element portion 306 allows the user to configure the element. The user may define general properties and properties that affect the behavior of the "Get Employee" listen element when the voice application under development is executed. For example, the user may name the element and specify whether a caller will be allowed to "barge-in," i.e., whether the voice application under development will be responsive to input received prior to completion of the welcome message.

In this embodiment, the user is also able to specify input modes of the listen element. Here the user can select options such as voice input, dual-tone multi-frequency (DTMF) touch-tone input, or both. In this example embodiment, the auto-attendant will allow a caller to input an extension number via touch-tone or voice or say the name of an employee. Some embodiments may also, or alternatively, allow a caller to say a role, such as "customer service" or "sales."

In the example embodiment, the user can also specify the type of listen element. The selected type of listen element within the illustrated user interface is a "graphical" listen element. A graphical listen element allows a user to tie the listen element to one or more data sources from which to build a grammar that the voice application under development will listen for.

Figure 5:
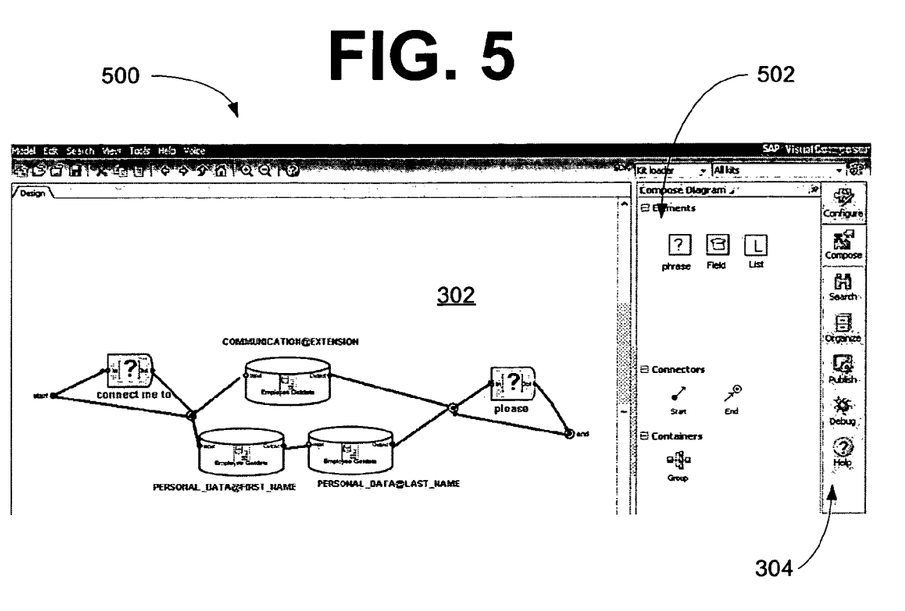
FIG. 5 is a diagram of an example user interface embodiment.

A user may then select the "Compose" item from the menu portion 304 while the listen element is selected in the design portion 302. Selection of the compose element in this instance causes the user interface 500 to be displayed.

FIG. 5 is a diagram of an example user interface 500 embodiment. The user interface 500 includes the design portion 302 and the menu portion 304. The user interface 500 also includes a compose diagram portion 502 that includes elements, connectors, and containers that can be added to a graphical listen element model via drag-and-drop functionality. Note that the possible elements include the various grammar types discussed above. These grammar types include phrase, field, and list.

The graphical listen element diagram displayed in the design portion 302 of the user interface 502 includes start and end connectors. The graphical listen element diagram also includes a phrase element "connect me to." There are also three field elements: COMMUNICATION@EXTENSION, PERSONAL_DATA@FIRST_NAME, AND PERSONAL_DATA@LAST_NAME. These field elements are tied to data source fields as will be discussed below with regard to user interfaces 600 and 700 of FIG. 6 and FIG. 7, respectively. These field elements will cause the application under development to listen for employee names and employee extensions. In the design portion 302 there is also illustrated another phrase element "Please" which will cause the voice application under development to optionally listen for the word "please" following an employee name or extension. Thus, the flow illustrated in the design portion 302 of the user interface 500 will cause a grammar to be built that will listen for a caller to provide voice input "connect me to" plus an employee name or an employee extension followed by "please."

Figure 6:
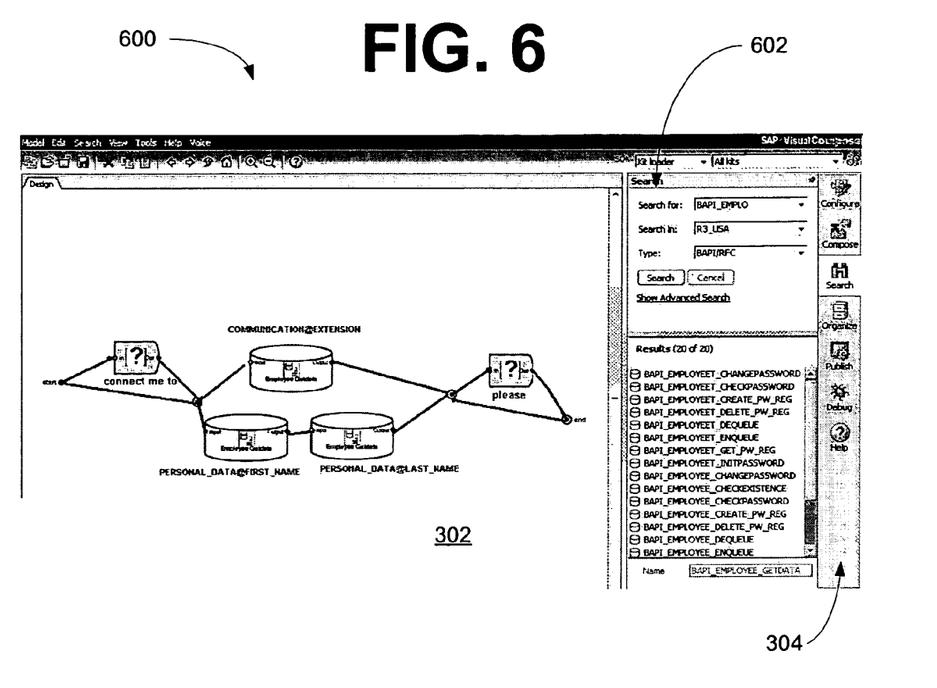
FIG. 6 is a diagram of an example user interface embodiment.

FIG. 6 is a diagram of an example user interface 600 embodiment. The user interface 600 includes the design portion 302, the menu portion 304, and a search portion 602 that allows a user to search for data fields. The search portion, in some embodiments, allows a user to search for data sources and fields within data sources. This can include specifying a database to connect to, database connection parameters, and database types. In some embodiments, the data source options include one or more of services or objects, functions, files, or other data sources. The results of a search are displayed within the search portion 602 of the user interface 602 and can be added and removed from the design portion 302 via drag-and-drop functionality.

After a field element is added to a graphical listen element flow, the data behind a field element can be limited to prevent retrieval of unwanted data. A user may modify the properties of a field element to limit the data via the user interface 700 of FIG. 7.

Figure 7:
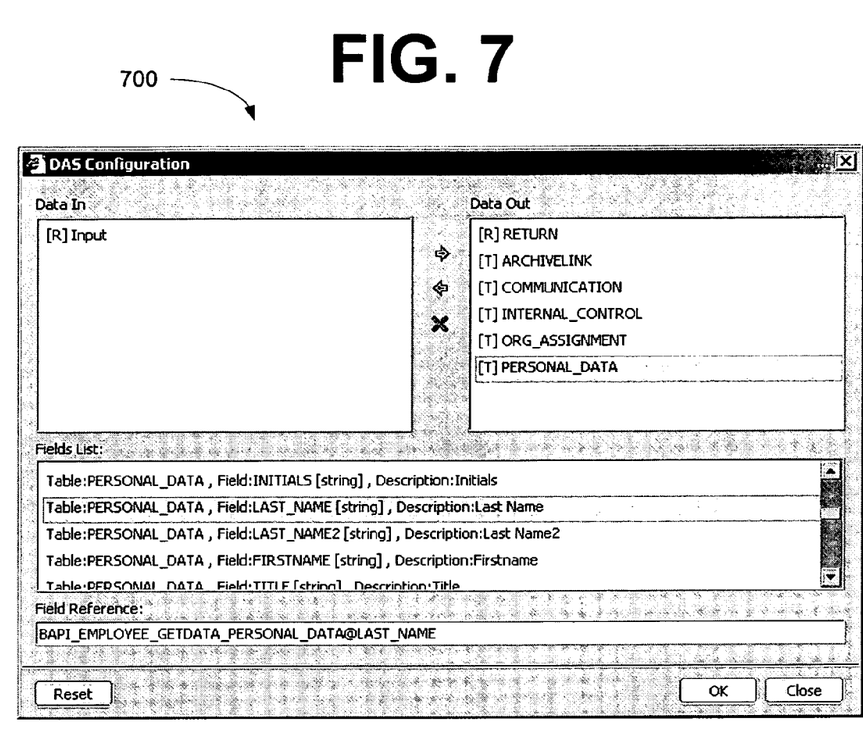
FIG. 7 is a diagram of an example user interface embodiment.

FIG. 7 is a diagram of an example user interface 700 embodiment. The user interface 700 allows a user to specify one or more data limits. In the auto-attendant embodiment, this can be used to specify an employee location when the parent organization has employees located in more than one location. For example, a limit can be placed on building number. A building number, in some embodiments, can be added as an input parameter that will be input when the data is retrieved. This will limit the employee and extension results to only those employees and extension located in a certain building. The input parameter, in some embodiments, can be specified globally. In other embodiments, the input parameter can be a flexible input parameter that can be specified at a time when the voice application is instantiated to allow a voice application to be deployed in multiple independent instances at several locations.

The user interface 700 is also be utilized to select or modify the data item output by a field element within the design portion 302 of the user interface 600. For example, the user interface 700 can be used to specify that for the field element "PERSONAL_DATA@LAST_NAME," output the data of field "Table:PERSONAL_DATA, Field:LAST_NAME [string], Description: Last Name."

Figure 8:
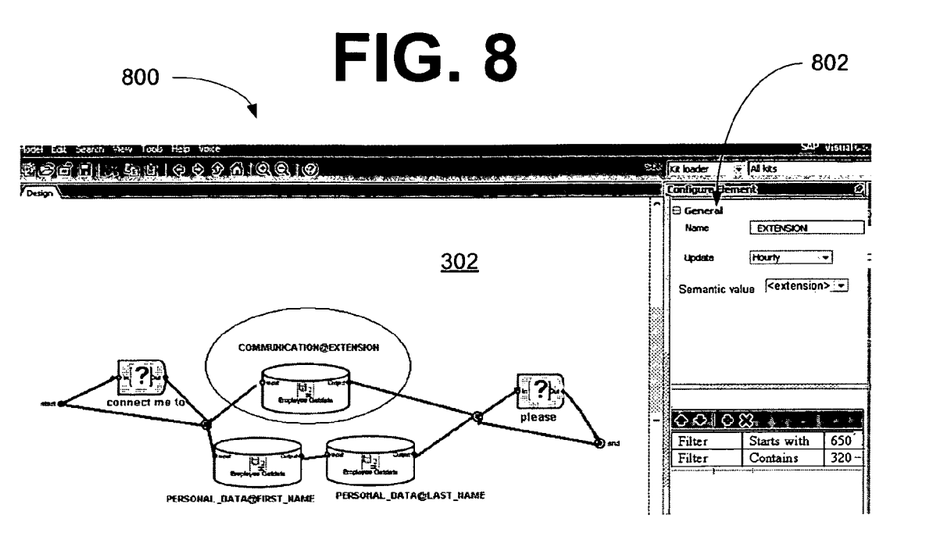
FIG. 8 is a diagram of an example user interface embodiment.

FIG. 8 is a diagram of an example user interface 800 embodiment. The user interface 302 includes the design portion 302 and a configure element portion 802. When a field element is selected within the design portion 302, the user may optionally add filters to the data behind the selected field element. An example of a filter on the "COMMUNICATION@EXTENSION" field element is to select employee extensions having a local phone number (e.g., "SELECT ONLY area_code=650 and prefix=320"). Another example is to filter out specific employees (e.g., NOT("first_name=sean && last_name=doyle"). In some embodiments, the filters include: contains, starts with, ends with, greater than, less than, and equals. In some embodiments, multiple filters can be combined with standard operators: AND, OR, XOR, and NOT.

The configure element portion 802 also allows a user to specify how often a field element is to be updated. This graphical listen element property tells the voice application to update the list element on a periodic basis equal to, or at least approximately equal to, the specified update interval. This is useful in instances where data is dynamic, such as employee names in a large company. Employee turnover in large companies can be high and often requires updating of voice applications, such as in the auto-attendant embodiment. Automatic updates allows for grammars derived from field elements to be updated automatically, removing the need for time consuming, error prone manual updates to voice application grammars.

Figure 9:
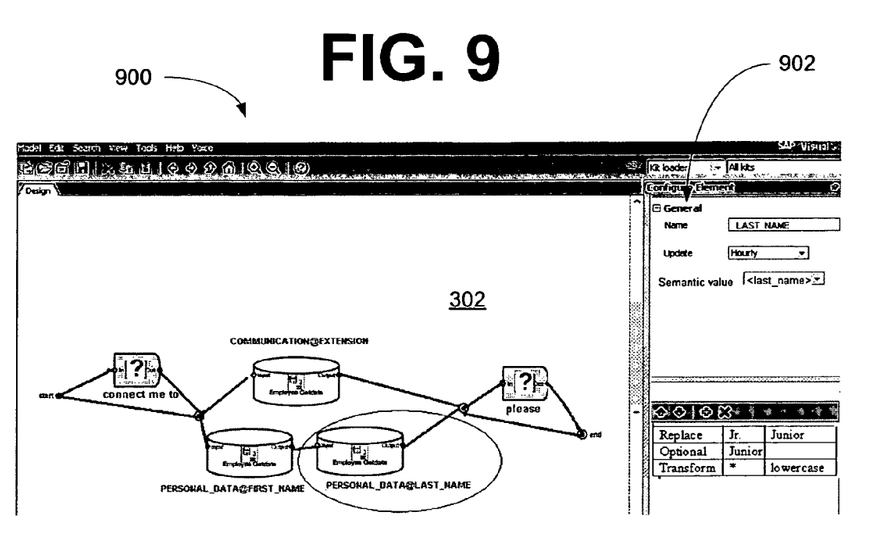
FIG. 9 is a diagram of an example user interface embodiment.

FIG. 9 is a diagram of an example user interface 900 embodiment. The user interface 900 includes the design portion 302 and a configure element portion 902. The configure element portion 902 allows a user to specify replace, optional, and transform properties for various elements.

In the instance of a field element, a user can specify a replace where data includes abbreviations, such as "jr." which will be replaced by "junior." A replace function causes the identified data value to be replaced with the replace value in a metadata representation of the graphical listen element.

An element word or phrase may also be designated as optional. For example, in the instance where an employee's legal name includes "junior," "junior" may be designated as optional. This allows for flexibility in various applications where an end user, such as a caller, may or may not provide the full legal name, but provides a common name. Another example of an optional designation is in phrase and list elements, such as the phrase element "please." Some callers may say "please," while others will not. In some embodiments, adding an optional designation to an element causes additional entries to be made in the metadata representation of the graphical listen element.

A transform is used wherein a voice platform requires that grammars be in a particular form, such as in all lowercase letters. A transform can be defined to cause data of list elements and other elements to be transformed into the appropriate form for a particular voice platform.

Figure 10:
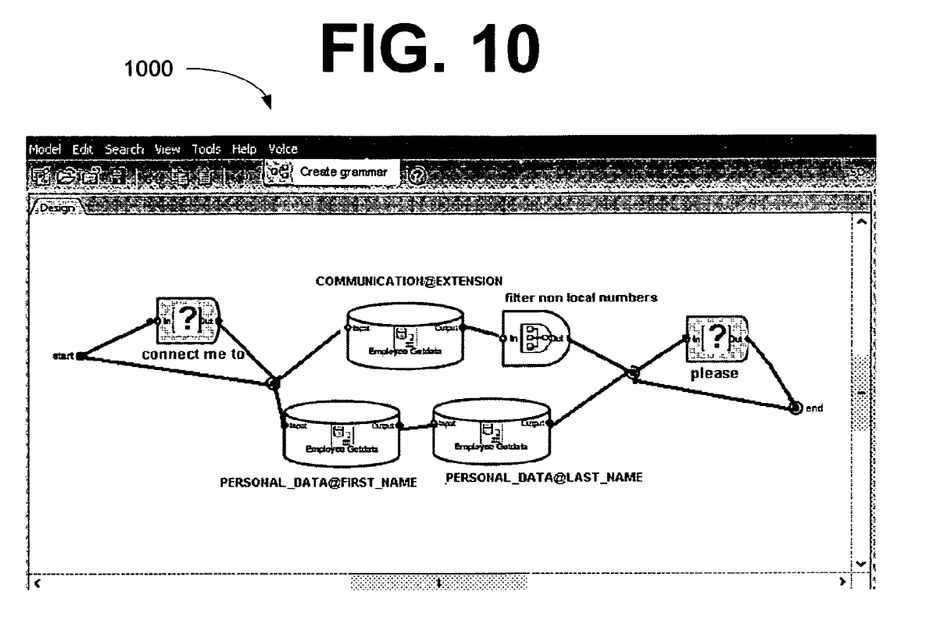
FIG. 10 is a diagram of an example user interface embodiment.

FIG. 10 is a diagram of an example user interface 1000 embodiment. The user interface 1000 illustrates a completed listen element model. Each element within the graphical listen element includes underlying properties, as described above, which will be reflected in a grammar created therefrom. A user may then select "CREATE GRAMMAR" to cause a grammar to be created from the graphical listen element model.

Figure 11:
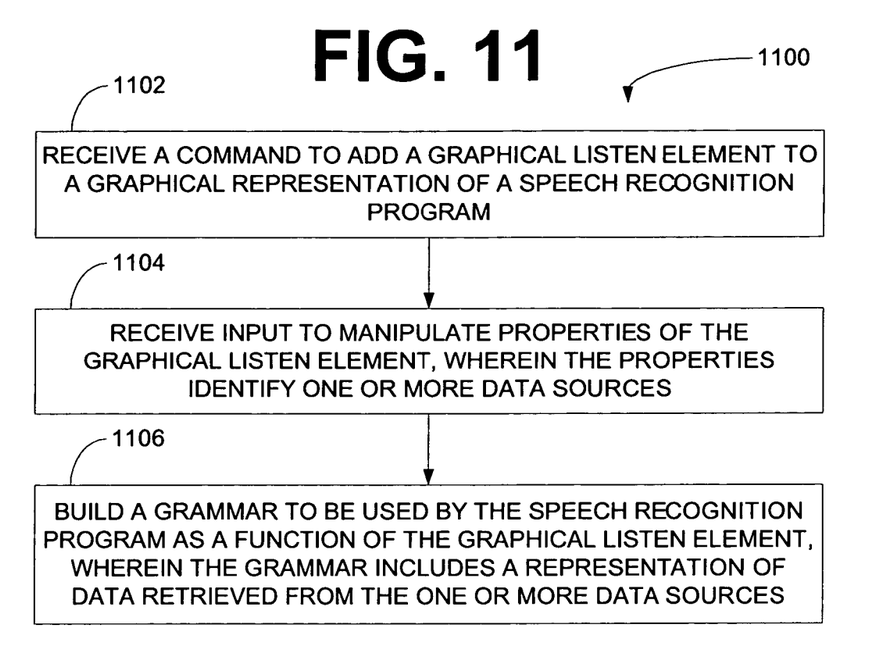
FIG. 11 is a flow diagram of an example method embodiment.

FIG. 11 is a flow diagram of an example method 1100 embodiment. The example method 1100 includes receiving a command to add a graphical listen element to a graphical representation of a speech recognition program 1102 and receiving input to manipulate properties of the graphical listen element, wherein the properties identify one or more data sources 1104. The method 1100 also includes building a grammar to be used by the speech recognition program as a function of the graphical listen element 1106. In some embodiments, the grammar includes a representation of data retrieved from the one or more data sources.

The received input to manipulate the graphical listen element properties may include input specifying an update interval period. In such instances, the grammar is automatically rebuilt by a voice application on a recurring basis in relation to the update interval period. Commonly, the graphical listen element properties identify data to be output when a grammar input is received by the speech recognition program when utilizing the grammar.

In some embodiments, building the speech recognition program grammar 1106 as a function of the listen element properties includes converting the graphical listen element into one or more target metadata representations. The one or more target metadata representations may include the metadata represented in XML-based markup text.

Figure 12:
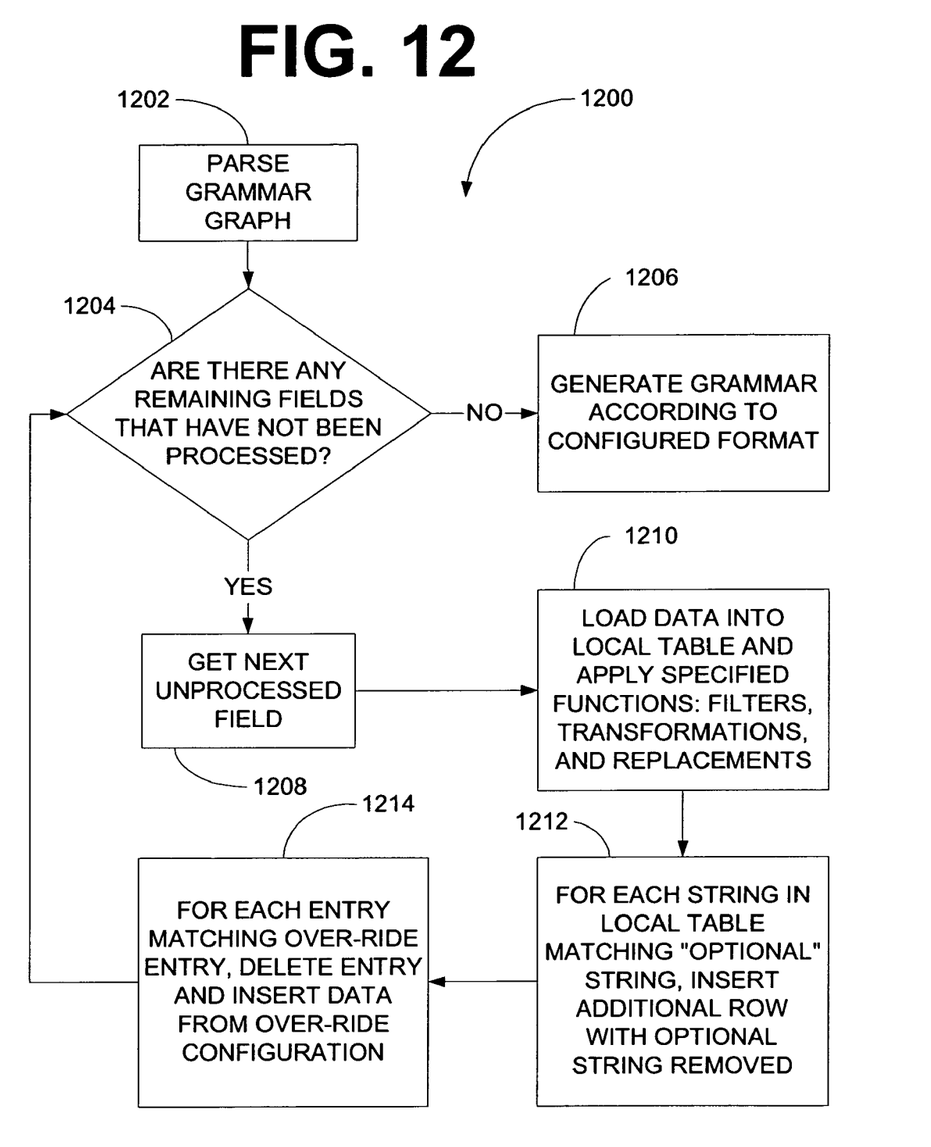
FIG. 12 is a flow diagram of an example method embodiment.

FIG. 12 is a flow diagram of an example method 1200 embodiment. The method 1200 is an example method that is performed in some embodiments, after a user issues a command in a graphical voice application development environment to create a grammar from a graphical listen element model. The method 1200 includes parsing a grammar graph 1202 to extract information from the graphical listen element model to determine what needs to be included in the grammar. The method 1200 then determines if there are any remaining fields that have not been processed 1204. During the first iteration, the method 1200 will get the first unprocessed field 1208 load data into a local table and apply any specified functions 1210. The functions can include filters, transformation, and replacements. The method 1200 then, for each string in the local table matching "optional" string, inserts an additional row with the optional string removed 1212. Then, for each entry matching an over-ride entry, the entry is deleted from the local table and data is inserted from the over-ride configuration 1214. Over-ride configurations can include an override of a particular data value when certain data items are encountered. For example, in an auto-attendant embodiment, all calls to employees that are members of the executive management team are to be routed to an executive secretary's extension. An over-ride configuration will cause this override to occur.

The method 1200 then determines again if there are any remaining fields that have not been processed 1204. If not, the method 1200 generates a grammar according to the configured format 1206. The configured format can be virtually any format required by a particular voice application execution environment.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A method comprising:
receiving a command to add a graphical listen element to a graphical model of a speech recognition program;
executing the received command on a processor of a computer performing the method to add the graphical listen element to the graphical model of the speech recognition program;
receiving input to manipulate properties of the graphical listen element, the properties identifying one or more data sources;
building a grammar to be used by the speech recognition program as a function of the graphical listen element, the grammar including a representation of data retrieved from the one or more data sources, wherein building the grammar includes:
for each of the one or more data sources, retrieving the data into a respective local table;
for each local table, identifying matches between data in the local table with over-ride entries; and
for each identified match with an over-ride entry, delete the matching entry in the local table and insert data from an over-ride configuration; and
storing, on a data storage device, at least one of the graphical listen element, the manipulated properties of the graphical listen element, and the grammar.

2. The method of claim 1, wherein the received input to manipulate the graphical listen element properties includes input specifying an update interval period, and wherein the grammar is rebuilt on a recurring basis in relation to the update interval period.

3. The method of claim 1, wherein the graphical listen element properties include a representation of one or more data source fields to be included in the grammar.

4. The method of claim 3, wherein the listen element properties include a representation of one or more filters to filter data source data when building the grammar.

5. The method of claim 3, wherein the graphical listen element properties include a transform rule, the transform rule identifying data to be transformed in the grammar and a form to transform the identified data into.

6. The method of claim 1, wherein the graphical listen element properties include an output representation identifying data to be output when a grammar input is received by the speech recognition program when utilizing the grammar.

7. A system comprising:
a processor;
a memory device;
a voice application modeling component stored in the memory device and executable by the processor to provide a graphical modeling environment within which voice applications are graphically modeled,
a listen element modeling component stored in the memory device and executable by the processor to provide a graphical modeling environment within which listen elements are graphically modeled, a graphically modeled listen element including properties to:
associate the listen element model with one or more of the one or more data sources, and
identify one or more data fields within the one or more data sources; and
a translation component stored in the memory device and executable by the processor to translate graphically modeled voice applications into a target metadata representation, the translation enabling a modeled voice application to be processed in a voice application runtime environment; wherein the translation component, prior to translating a graphically modeled voice application into a target metadata representation, is executable to:
retrieve data from each of the one or more data sources into respective local tables;
for each local table, identifying matches between data in the local table with over-ride entries; and
for each identified match with an over-ride entry, delete the matching entry in the local table and insert data from an over-ride configuration.

8. The system of claim 7, wherein the translation component, when translating a graphically modeled voice application including a graphical model of a listen element:
retrieves the data of the one or more identified data fields within the one or more data sources; and
renders the retrieved data into a voice application grammar representation of the target metadata representation as a function of the graphical listen element properties.

9. The system of claim 7, wherein the properties of a graphically modeled listen element represent one or more filters to filter data of the identified data fields when processed by the translation component.

10. The system of claim 7, wherein:
the properties of the graphically modeled element include an output representation associated with the identified one or more data fields within the one or more data sources; and
the target metadata representation, when processed within the voice application runtime environment, identifies an output in response to a received input as a function of the output representation.

11. The system of claim 7, wherein an output representation identifies one or more data fields within the one or more data sources.

12. A computer-readable storage medium, including an instruction set stored thereon, which when executed by a processor of a computer causes the computer to:
present one or more user interfaces through which to receive input to define and manipulate properties of a graphical listen element, the properties identifying one or more data sources; and
build a speech recognition program grammar as a function of one or more graphical listen elements, the grammar including a representation of data retrieved from the one or more data sources, wherein building the grammar includes:
for each of the one or more data sources, retrieving the data into a respective local table;
for each local table, identifying matches between data in the local table with over-ride entries; and
for each identified match with an over-ride entry, delete the matching entry in the local table and insert data from an over-ride configuration; and
store, on a data storage device, at least one of the graphical listen element, the manipulated properties of the graphical listen element, and the grammar.

13. The computer-readable medium of claim 12, wherein the input to manipulate the graphical listen element properties includes input specifying an update interval period, wherein the grammar will be rebuilt on a recurring basis in relation to the update interval period.

14. The computer-readable medium of claim 12, wherein the graphical listen element properties allow a representation of one or more words and phrases to be included in the grammar.

15. The computer-readable medium of claim 12, wherein the graphical listen element properties allow a representation of one or more data source fields to be included in the grammar.

16. The computer-readable medium of claim 15, wherein the listen element properties allow a representation of one or more filters to filter data source data when building the grammar.

17. The computer-readable medium of claim 15, wherein the graphical listen element properties allow inclusion of a transform rule, wherein a transform rule identifies data to be transformed in the grammar and a form to transform the identified data into.

18. The computer-readable medium of claim 12, wherein the graphical listen element properties include an output representation identifying data to be output when a grammar input is received by the speech recognition program when utilizing the grammar.

19. The computer-readable medium of claim 12, wherein building the speech recognition program grammar as a function of the listen element properties includes:

converting the graphical listen element into one or more target metadata representations.

20. The computer-readable medium of claim 12, wherein the one or more data sources include an object.

* * * * *